United States Patent [19]

Goldstein

[11] 4,316,544
[45] Feb. 23, 1982

[54] INCLINED BICYCLE STORAGE RACK EMPLOYING CHANNEL WITH MIDPOINT FRAME SHACKLE

[76] Inventor: Irv Goldstein, 2049 Brown Ave., #B-4, Cornwells Heights, Pa. 19020

[21] Appl. No.: 124,284

[22] Filed: Feb. 25, 1980

[51] Int. Cl.³ .............................................. E05B 73/00
[52] U.S. Cl. ........................................ 211/5; 211/19; 211/20; 70/234; 70/1
[58] Field of Search ...................... 211/17–24, 211/5; 70/233–236

[56] References Cited

U.S. PATENT DOCUMENTS

| 537,583 | 4/1895 | Reid et al. | 211/22 |
|---|---|---|---|
| 2,508,302 | 5/1950 | Stue | 70/233 X |
| 3,802,232 | 4/1974 | Mattson et al. | 70/234 |
| 3,863,767 | 2/1975 | Garwood | 211/20 |
| 3,865,244 | 2/1975 | Galen et al. | 211/24 |
| 3,865,245 | 2/1975 | Lieb et al. | 70/234 |
| 4,015,718 | 4/1977 | Bernard | 211/20 |
| 4,126,228 | 11/1978 | Bala et al. | 70/234 |
| 4,171,077 | 10/1979 | Richard | 211/18 |

FOREIGN PATENT DOCUMENTS 529823 11/1940 United Kingdom ................. 211/18

*Primary Examiner*—Francis K. Zugel
*Attorney, Agent, or Firm*—David Pressman; Robert K. Youtie

[57] ABSTRACT

A bicycle rack including a forwardly inclined framework having an upper front wheel receiver and a lower rear wheel receiver, and a shackle carried by the framework for releasable retaining engagement with the frame of a bicycle having its wheels in the wheel receivers.

9 Claims, 7 Drawing Figures

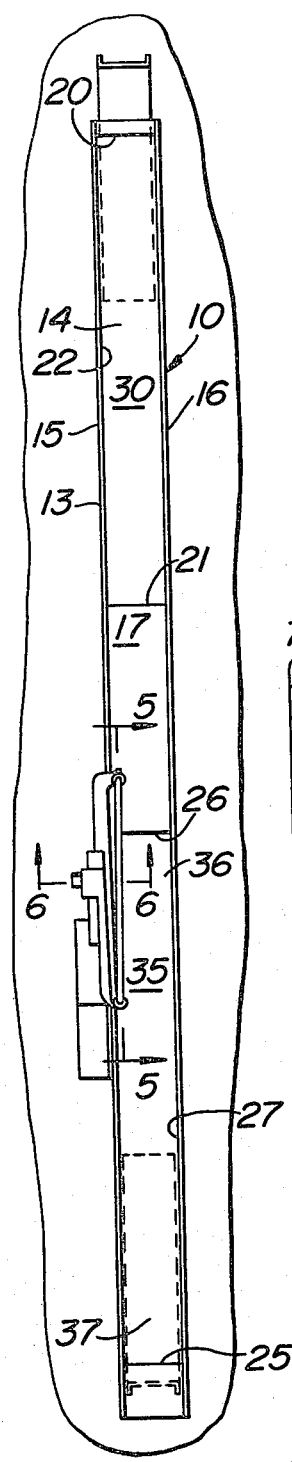
FIG. 2
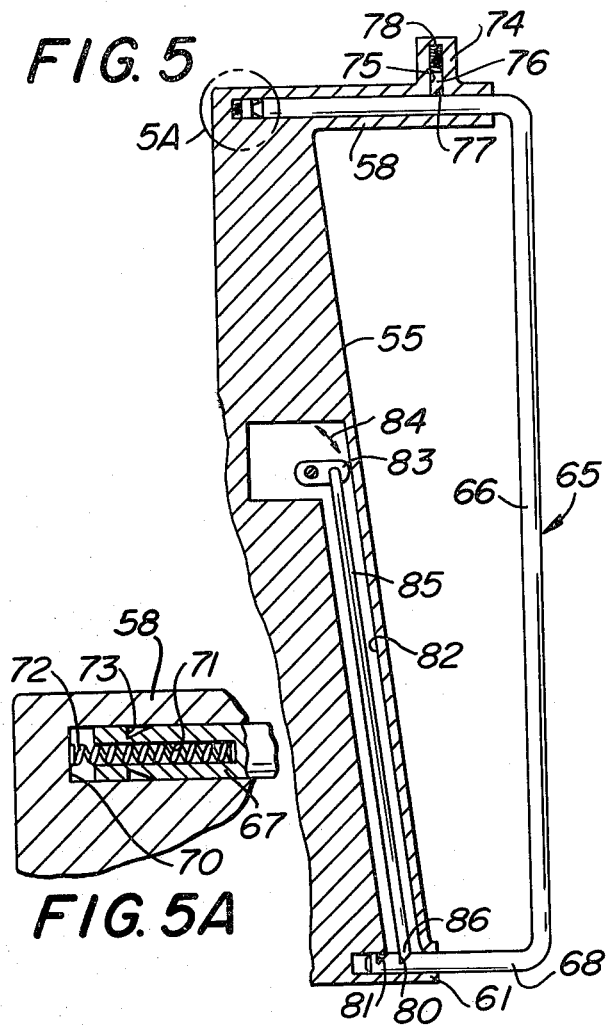
FIG. 5
FIG. 5A
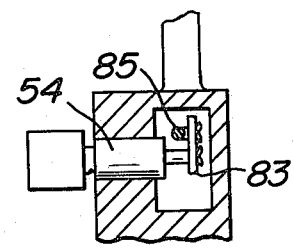
FIG. 6

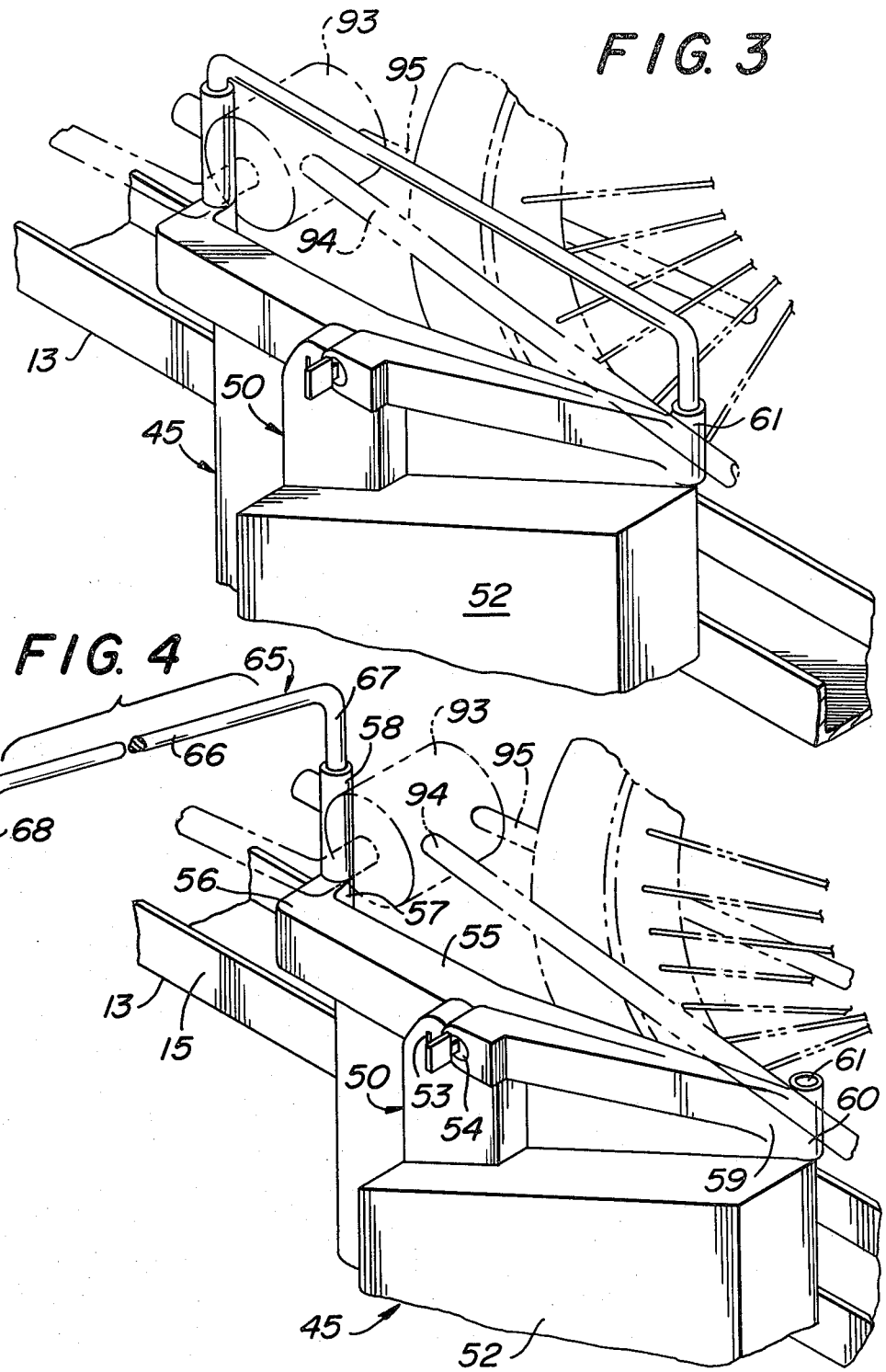

INCLINED BICYCLE STORAGE RACK EMPLOYING CHANNEL WITH MIDPOINT FRAME SHACKLE

BACKGROUND OF THE INVENTION

As is well known to those versed in the field of bicycles, the need for bicycle racks is rapidly increasing, and present bicycle racks are not entirely satisfactory. For example, many present bicycle racks secure only a single wheel, so that the other bicycle wheel and bicycle frame may be stolen. Also, many current bicycle racks effectively secure the bicycle frame, but leave the wheels unsecured. Securement of both the bicycle frame and its wheels has, heretofore, required bicycle racks of complex and expensive construction, difficulty in use, and considerable expense in manufacture, maintenance and repair.

OBJECTS OF THE INVENTION

Accordingly, it is an important object of the present invention to provide a highly-improved construction of bicycle rack which effectively secures a bicycle frame and both its wheels against theft; is extremely easy to use both in placement and securement of a bicycle in the rack as well as release and removal therefrom; and which is extremely simple and durable in construction and entirely reliable in operation throughout a long useful life to effect substantial savings in both initial cost and maintenance.

Other objects of the present invention will become apparent upon reading the following specification and referring to the accompanying drawings, which form a material part of this disclosure.

BRIEF DESCRIPTION OF THE DRAWINGS

FIG. 2 is a front elevational view, taken from the right of FIG. 1 showing a bicycle rack of the present invention without a bicycle.

FIG. 3 is a partial, perspective view showing an intermediate region of the bicycle rack of FIG. 1 illustrating the bicycle shackling means of the instant invention in a locked condition.

FIG. 4 is a partial perspective view similar to FIG. 3, but illustrating the shackling means in an open or releasing condition, the shackle itself being broken away to conserve drawing space.

FIG. 5 is a partial sectional elevational view taken generally along the line 5—5 of FIG. 2.

FIG. 5A is an enlarged partial view showing generally the area noted 5A in FIG. 5.

FIG. 6 is a partial sectional elevational view taken generally along the line 6—6 of FIG. 2.

DESCRIPTION OF THE PREFERRED EMBODIMENT

Figure 1:
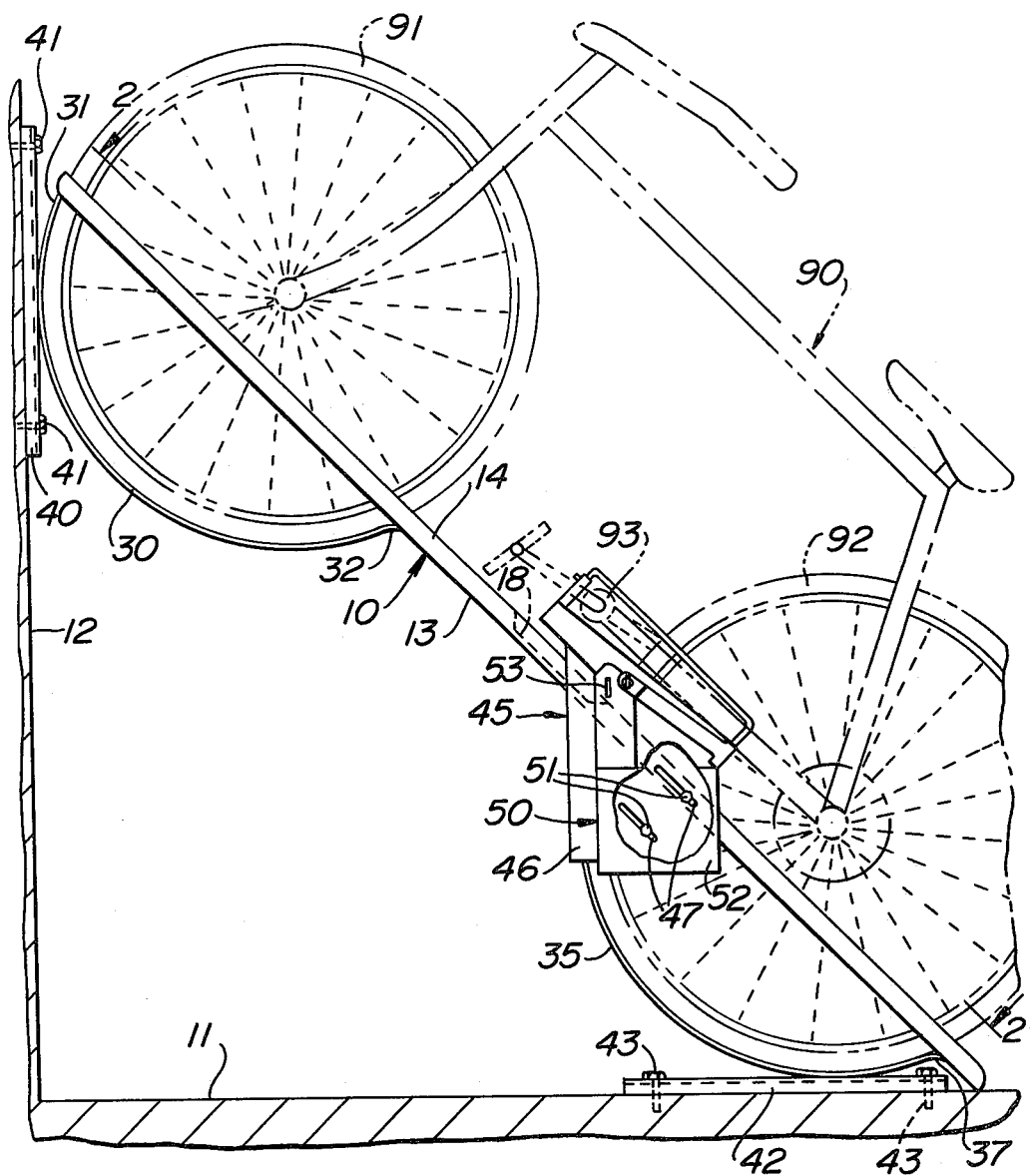
FIG. 1 is a side elevational view showing a bicycle rack constructed in accordance with the teachings of the present invention, and illustrating in phantom a bicycle secured in the rack.

Referring now more particularly to the drawings, and specifically to FIGS. 1 and 2 thereof, a bicycle rack is there generally designated 10, and, as best seen in FIG. 1, extends generally forwardly and upwardly, between a ground surface 11 and a wall surface 12 upstanding from the ground surface. Of course, suitable supporting or mounting means may be provided in place of the ground and wall surfaces 11 and 12.

The rack 10 may include an elongate framework 13, which may be composed of a channel 14. The channel is inclined at approximately 45°, and includes a pair of longitudinally extending, generally parallel spaced, inclined side pieces or channel flanges 15 and 16 connected together by a inclined laterally extending intermediate wall or web 17. The intermediate channel wall or web is cut away in its upper region, as between an upper and forwardmost edge 20 facing rearwardly and downwardly; and an intermediate, forwardly and upwardly facing edge 21. Thus, there is defined between the edges 20 and 21, and side pieces or flanges 15 and 16, a forward and upper opening 22. Similarly, the rearward region of the channel 14 is cut away or open, as by removal of the lateral wall or web 17 between a rearmost, forwardly and upwardly facing laterally extending edge 25; and an intermediate, downwardly and rearwardly facing, laterally extending edge 26. The intermediate edge 26 is spaced rearwardly and downwardly from the intermediate edge 21. Therefore, there is defined in the channel 14 of framework 13 a rearward and lower opening 27 between the edges 25 and 26 and side pieces or flanges 15 and 16.

Below the forward and upper framework opening 22 is an arcuate, upwardly concave, longitudinally extending wheel support member or strip 30. More specifically, the wheel support member 30 may be of generally circular curvature, concave upwardly, having an upper, forward end region 31 suitably secured, as by welding or other means, to framework 13 proximate to edge 20. The rearward and lower end region 32 of wheel support member 30 may be suitably secured to the framework 13 proximate to edge 21. Thus, framework opening 22 and its nether wheel support 30 combine to define an upwardly and rearwardly opening wheel receiver or well, for a purpose appearing more fully hereinafter.

Similarly, a lower and rearward wheel support member or arcuate strip 35 is located beneath the lower, rearward framework opening 27, having a forward, upper region 36 suitably secured to the framework proximate to framework edge 26, and having a lower, rearward end region 37 suitably secured to the framework edge 25. The upwardly and rearwardly facing, arcuate strip 35 combines with the rear framework opening 27 to define a rear wheel well or receiver, as will appear more fully hereinafter.

Further, a forward and upper mounting member 40, such as a generally vertically disposed channel, may be suitably fixed, as by welding or other means, generally tangent to the forward wheel support 30, and secured, as by fasteners 41, in facing engagement with upright wall 12. Similarly, a lower and rearward mounting member 42, such as a channel piece, may be welded or otherwise secured generally tangent to the underside of wheel support 35, and anchored in horizontal facing engagement with the ground surface 11, as by fasteners 43.

Carried by the framework 13, intermediate the longitudinal extent thereof, is a bicycle shackling mechanism, generally designated 45. The shackling mechanism includes a mounting plate 46, which may be of approximately triangular configuration, and disposed generally vertically on one side of, the left side of channel 14. Mounting plate 46 is suitably affixed, as by welding or other desired means, to channel 14, say being secured fast to channel side piece 15, and depending therefrom.

Provided in the mounting member or plate 46 may be a pair of adjustment elements or slots, as at 47 in FIG. 1, extending in parallelism with each other and longitudinally of the channel 14. Slots 47 in plate 46 are seen through a cutout (made for illustrative purposes) in a shackle body 50.

The shackle means 45 further includes shackle body 50 having a pair of projecting pins 51, each slidable in a respective slot 47 and thereby mounting the shackle body 50 for sliding adjustment longitudinally of the channel 14 within the limits of the pin-in-slot connection 51,47. Shackle body 50 may include in a lower region a coin-receiving chamber or box 52, and extending upwardly therefrom and in communication therewith a coin receiver 53. Associated with the coin receiver is a key lock 54, as of the tumbler type, in which the lock is operable and the key removable responsive to insertion of a coin in slot 53.

The shackle body 50 further includes a generally longitudinally-extending body part 55, of elongate configuration extending longitudinally along and spaced above side piece 15 of framework 13. The longitudinal body part 55, in the illustrated embodiment, is on the left side of framework 13 to accommodate the bicycle's sprocket wheel. Extending laterally inwardly or rightward from the forward, upper end 56 of longitudinal body part 55, partially over the channel 14, is an extension or arm 57, which is provided with a socket or sleeve 58 upstanding obliquely rearward from arm 57, generally normal to channel 14. Similarly, rearward end portion 59 of longitudinal body part 55 is provided with a laterally inturned end region 60 having an upwardly and rearwardly opening socket or sleeve 61.

In addition, shackle mechanism 45 includes an elongate shackle member or rod 65 of generally inverted U-shaped configuration, including an intermediate part 66, and forward and rearward parts 67 and 68 depending from the forward and rearward ends of the intermediate part. More specifically, forward shackle rod part 67 is inserted for longitudinal sliding and rotative movement into forward sleeve 58 to mount shackle rod 65 for swinging movement, as between its positions of FIGS. 3 and 4. Rearward shackle part 68 is removably insertable into and withdrawable from the rear sleeve 61, and swingable generally about the axis of forward shackle part 67, between the positions of FIGS. 3 and 4.

As seen in FIGS. 5 and 5a, sleeve or bushing 58 is formed internally with a blind hole having a bottom wall 70, and shackle rod end portion 67 is provided with a counter bore 71 receiving a coil compression spring 72 in bearing engagement with bottom wall 70. Further, shackle end part 67 is formed with an external, circumferential notch 73, which may be bevelled for one way insertion into and removal from the notch of a retaining pin.

A boss 74 may be provided on the sleeve or bushing 58, adjacent to an upper region thereof, and provided with an internal hollow or bore 75 opening into the interior of the sleeve. A retaining member or pin 76 is slidably received in bore 75, having a bevelled end 77 toward the interior hollow of sleeve 58, and resiliently biased toward the latter by a coil compression spring 78. Thus, it will be appreciated that shackle rod 68 is mounted for movement upward away from framework 13 to a limiting position with retaining pin 77 engaged in notch 73, and is capable of yieldable movement downwardly to the position shown in FIG. 5, with the pin 77 retracted, by bevelled riding out of the notch 73.

The other end part 68 of shackle rod 65, see FIG. 5, is removably insertable into sleeve 61, and is provided adjacent to its free end with a plurality of bevelled notches 80 and 81 spaced along the end part.

Interiorly of longitudinal body part 55, extending longitudinally thereof, between the interior of sleeve 61 and key lock 54 is a passageway 82. Keylock 54 includes a crank arm 83 rotatable back and forth as indicated by arrow 84, and an elongate locking bar, rod or dog 85 is disposed in passageway 82 and has one end pivotally connected to rotary arm 83. The other end of locking dog, rod or bolt 85 is bevelled, as at 86 for removable insertion into a selected one of notches 80 and 81. The complementary bevels of notches 80 and 81, and bolt end 86 are arranged to facilitate insertion of shackle rod end 68 with bolt end 86 riding over the inserted rod end part, while preventing retraction of the shackle rod end part 68 without positive withdrawal of dog 85 from its positive holding engagement with retained rod end part 68. In practice, crank arm 83 may be resiliently biased in the clockwise direction, as seen in FIG. 5, if desired.

A bicycle is shown in phantom in FIGS. 1, 3 and 4, and there generally designated 90. The bicycle may be entirely conventional, including front and rear wheels 91 and 92, and a pedal shaft bushing or sleeve 93 having a pair of laterally spaced rear fork tubes 94 and 95. The bicycle construction is simplified for purposes of illustration.

Responsive to insertion of a suitable coin in slot 53, key 54 may be turned to release shackle member 65 to the position shown in FIG. 4. A bicycle 90 may then be positioned as illustrated, with the front and rear wheels 91 and 92 in the front and rear wheel openings or receivers 22 and 27, and the pedal shaft bushing or sleeve 93 located just rearward of shackle rod front sleeve 58, as seen in FIG. 1. The entire shackle assembly 45 is shiftable along slots 47 to achieve the desired location of sleeve 58 just forward of bicycle bushing 93 with a wide variety of bicycle sizes and styles. Also, the rightward frame member or flange 16 may be notched or cut away, as seen at 18 in FIG. 1, to clear a sprocket wheel or accommodate bushing 93 of smaller, lower bicycles. Shackle 65 may then be swung rearwardly to a longitudinal relation with respect to framework 13, and shifted toward framework or channel 14 with rear shackle part 68 entering between rear fork tubes 94 and 95 and into the rear shackle sleeve 61 for locking engagement therein, as seen in FIG. 5. In this condition, both front and rear wheels are engaged in their respective wells so that their theft is effectively prevented, while the bicycle frame is secured by shackle means 45. Front shackle rod part 67 serves to connect the shackle rod to body part 55, and rear shackle rod part 68 serves to releasably retain the shackle rod with respect to the body part, and may therefore be considered a retaining part. The plural notches 80 and 81 in retaining shackle part 68 permit selective positioning of shackle rod 65 in its locked position toward the framework 13, according to bicycle size and shape.

Of course, operation of key lock 54 to withdraw locking dog 85 from retaining engagement with retaining shackle rod part 68 releases the latter for shackle rod movement away from the framework 13 and swinging outward movement to its fully opened position of FIG. 4 for repetition of the above described cycle of operation.

From the foregoing, it is seen that the present invention provides a bicycle rack which is extremely simple in construction and operation, of uniquely high security, economical to manufacture and maintain, and which otherwise fully accomplishes its intended objects.

Although the present invention has been described in some detail by way of illustration and example for purposes of clarity of understanding, it is understood that certain changes and modifications may be made within the spirit of the invention and therefore the true scope of the invention should be determined only by the appended claims and their legal equivalents.

What is claimed is:

1. A bicycle rack comprising:
   a framework having an elongated channel member, the front end of said channel member being elevated with respect to its rear end,
   a front portion of said channel member having an opening therein for receiving a bicycle's front wheel,
   a front wheel receiver comprising a concave wheel support carried by said channel and extending below said opening,
   a rear portion of said channel member being at an elevation lower than said front portion and having an opening therein for receiving a bicycle's rear wheel,
   a rear wheel receiver comprising a concave wheel support carried by said channel and extending below said rear wheel opening, thereby to be able to carry a bicycle in an inclined position, with its front wheel higher than its rear wheel, and
   shackle means on said channel member between said front and rear portions thereof for movement into and out of retaining and locking engagement with a bicycle, when carried by said rack, at a frame portion of said bicycle between the wheels thereof.

2. A bicycle rack according to claim 1, said shackle means comprising a body mounted along an intermediate region of said channel member, and a shackle rod having one end shiftably retained in said body for removable engagement about a bicycle frame and having its other end releasably retained by said body in said removable engagement.

3. A bicycle rack according to claim 2, in combination with mounting means mounting said body for adjustable positioning longitudinally of said framework for effecting said removable engagement with differently configured bicycle frames.

4. A bicycle rack according to claim 3, said shackle rod comprising an intermediate part disposed above said body and extending generally longitudinally of said framework, a forward connecting part extending transversely from said intermediate part and connected to said body for shifting movement toward and away from said body and swinging movement of said intermediate part into and out of overlying relation with said framework, and a rearward retaining part extending transversely from said intermediate part for releasable retention inserted in said body when said intermediate part is swung into overlying relation with and shifted toward said body.

5. A bicycle rack according to claim 4, in combination with a locking dog shiftable in said body between a locking position in retaining engagement with said retaining part and a releasing position out of retaining engagement with said retaining part.

6. A bicycle rack according to claim 5, in combination with resilient means yieldably urging said shackle away from said body, said locking dog comprising a bolt having one end configured for releasable interfitting with said retaining part to effect said retaining engagement, and a key lock operatively connected to the other end of said bolt for selectively retracting the latter from said retaining engagement.

7. A bicycle rack according to claim 3, said mounting means comprising a pin-in-slot connection between said body and framework, and said shackle rod being of inverted generally U-shaped configuration for removable engagement about the pedal shaft housing of a bicycle.

8. The bicycle rack of claim 1 further including means at the front end of said framework for attaching said front end to a wall at a spaced location above a floor, and means at the rear end of said framework for attaching said rear end to said floor at a spaced location from said wall.

9. The bicycle rack of claim 8 wherein said front attachment means are on said front wheel receiver and said rear attachment means are on said rear wheel receiver.

* * * * *